United States Patent
DiOrio

(10) Patent No.: US 6,471,164 B2
(45) Date of Patent: Oct. 29, 2002

(54) COMPUTER MOUSE AND ARM REST

(76) Inventor: James J. DiOrio, S3 W31963 Mary Ct., Delafield, WI (US) 53018

(*) Notice: Subject to any disclaimer, the term of this patent is extended or adjusted under 35 U.S.C. 154(b) by 0 days.

(21) Appl. No.: 09/968,935

(22) Filed: Oct. 2, 2001

(65) Prior Publication Data

US 2002/0017594 A1 Feb. 14, 2002

Related U.S. Application Data

(62) Division of application No. 09/594,431, filed on Jun. 15, 2000.

(51) Int. Cl.7 .................................................. B68G 5/00
(52) U.S. Cl. ................. 248/118; 248/118.1; 248/118.3; 248/918; 108/69; 312/281
(58) Field of Search ............................... 248/118, 118.1, 248/118.3, 118.5, 918, 231.61; 108/69, 152, 17, 65, 159.11, 157.12; 312/281

(56) References Cited

U.S. PATENT DOCUMENTS

| | | | | |
|---|---|---|---|---|
| 1,644,441 A | * | 10/1927 | Brien ........................ | 248/118 |
| 2,477,898 A | * | 8/1949 | Rehman et al. .............. | 248/118 |
| 4,621,781 A | * | 11/1986 | Springer ..................... | 248/118 |
| 5,147,090 A | * | 9/1992 | Mandell et al. ........... | 248/118.1 |
| 5,288,042 A | * | 2/1994 | Grimm ....................... | 248/118 |
| 5,320,313 A | * | 6/1994 | Crowe ....................... | 248/231.6 |
| 5,346,164 A | * | 9/1994 | Allen ......................... | 248/118 |
| D366,379 S | * | 1/1996 | Graeber ..................... | D6/511 |
| 5,590,607 A | * | 1/1997 | Howard ..................... | 108/98 |
| 5,833,180 A | * | 11/1998 | Baranowski ............... | 248/118 |
| 5,975,469 A | * | 11/1999 | Chen ......................... | 248/118.1 |
| 6,109,571 A | * | 8/2000 | Hirschovits et al. ........ | 248/118 |
| 6,131,522 A | * | 10/2000 | Chavez ...................... | 108/90 |
| 6,357,703 B1 | * | 3/2002 | Diorio ........................ | 248/118 |

* cited by examiner

Primary Examiner—Kimberly T. Wood
(74) Attorney, Agent, or Firm—Andrus, Sceales, Starke & Sawall, LLP

(57) ABSTRACT

A computer mouse support and lower arm rest is mounted on a primary support surface having a front edge thereon. The arm rest includes a padded, foldable arm support surface adapted to support the lower arm of the user. The arm support surface defines an upper support region, and a lower support region. The upper support region is connected to the primary support surface by attachment structure and is adapted to support an input device, such as a mouse, thereon along with the hand and wrist of the user. The lower support region has an operating position coplanar with the upper support region for supporting the forearm and elbow of a user, and a storage position folded forwardly over the upper support region for protectively covering the mouse.

9 Claims, 10 Drawing Sheets

COMPUTER MOUSE AND ARM REST

CROSS REFERENCE TO RELATED APPLICATION

This application is a divisional application Ser. No. 09/594,431 filed Jun. 15, 2000.

FIELD OF THE INVENTION

This invention relates broadly to a support construction connected to a primary support surface, such as a desktop, for supporting a computer and a keyboard and, more particularly, pertains to a rest attachment for providing full, stable support of one's lower. arm while operating a mouse or other input device at a comfortable position adjacent the computer.

BACKGROUND OF THE INVENTION

The increasing popularity of the personal computer in the home and workplace has been accompanied by rising occurrences of repetitive motion stress injuries to mouse and keyboard operators. Over a prolonged period of time, an operator must maintain his or her arm in a partially elevated and often incompletely supported condition which leads to strain and fatigue in the neck, shoulder, arm, wrist and head regions. One particular ailment experienced by workers who regularly operate input devices such as keyboards and computer mouses is carpal tunnel syndrome which is caused by a swollen tendon pressing on a nerve in one's wrist. In an effort to overcome the discomfort and pain resulting from use of a mouse and other input devices, many rest and support devices have been introduced over the last decade.

U.S. Pat. No. 5,058,840 issued Oct. 22, 1991, discloses an arm rest assembly characterized by a forearm cradle and a detachable slide which is pivotable and allows linear movement of one's arm toward and away from the assembly. The cradle is provided with springs to counteract the weight of the user's arm.

U.S. Pat. No. 5,119,742 issued Jun. 9, 1992, shows a shelf-like mouse support having a dual clamping arrangement and locking structure cooperating with a pair of extension arms whereby a mouse work surface is rigidly attached to a computer work area to provide a work surface which is above or below the work area.

U.S. Pat. No. 5,342,006 issued Aug. 30, 1994, sets forth an attachable arm rest comprised of a rigid support frame, a cushion member atop the support frame, and a cantilever attached from beneath and extending to a position forwardly of the frame.

U.S. Pat. No. 5,402,975, issued Apr. 4, 1995, illustrates an articulated forearm support attached to the edge of a desk or table which positions the support plate at various heights and inclinations.

U.S. Pat. No. 5,727,759, issued Mar. 17, 1998, covers a chairattached, T-shaped wrist pad and arm support which can be adjusted in different vertical and horizontal planes.

U.S. Pat. No. 5,743,499, issued Apr. 28, 1998, teaches a computer operator arm support having a swiveling arm which is clamped to a desk, and a sliding member movable along the swiveling member for supporting the user's arm in a free moving side-to-side fashion.

U.S. Pat. No. 5,832,840, issued Nov. 10, 1998, relates to a tilt adjustable shelf bracket which can be swiveled between an operating position adjacent a mouse work surface and a storage position concealed beneath the mouse work surface.

U.S. Pat. No. 5,876,002, issued Mar. 2, 1999, refers to an arm and mouse support which is variously attached to a desk top, table overhang, or drawer.

U.S. Pat. No. 5,975,469, issued Nov. 2, 1999, reveals an elbow support featuring a double pivoting arm construction which is clamped to the edge of a desk. A mouse sheet is made to be movable when the user adjusts the height of an elbow support disc.

U.S. Pat. No. 5,84,244, issued Nov. 16, 1999, depicts a removable mouse support and wrist pad which is clamped to a tabletop and swivels back and forth above or below the tabletop.

Despite the many attempts of prior art designs, there remains a genuine need for a full support arm rest and mouse support oriented in an ergonomically efficient manner which will alleviate the strain and fatigue on the user of the mouse or input device.

SUMMARY OF THE INVENTION

It is a general object of the present invention to provide a rest construction for supporting a person's appendage, namely one's lower arm, while operating a computer input device, such as a mouse, in an ergonomically correct and comfortable position.

It is one object of the present invention to provide a cushioned or padded lower arm rest which may be permanently or removably attached to selected areas of a primary work surface supporting a computer and keyboard.

It is another object of the present invention to provide a mouse support arm rest which offers full support along the entire limb length of the lower arm.

It is also an object of the present invention to provide a lower arm rest which maintains a level support plane whether the arm support surface is parallel or tilted relative to the primary support surface.

It is a further object of the present invention to provide a hinged arm rest which is easily movable from an arm supporting operating position to a forwardly folded storage position which protectively covers the mouse.

It is still another object of the present invention to provide a low profile lower arm rest which incorporates a wrist pad to minimize the effects of muscle strain when utilizing the mouse.

Yet another object of the present invention is to provide a lower arm rest used in conjunction with a mouse support which is selectively positioned at a location adjacent the computer and keyboard which allows maximum comfort for the user.

It is an additional object of the present invention to provide a lower arm rest which is conveniently adjustable in vertical and horizontal planes, yet fully stable in use.

Still another object of the present invention is to provide a lower arm rest having a minimum of components so as to present an attractive price to the consumer.

In one aspect of the present invention, a lower arm rest is adapted to be mounted on a primary support surface having a front edge thereon. The arm rest includes a padded, foldable arm support surface adapted to support the lower arm of the user. The arm support surface defines an upper support region and a lower support region. The upper support region is connected to the primary support surface by attachment means and is adapted to support an input device thereon along with the hand and wrist of the user. The lower support region has an operating position coplanar with the upper support region for supporting the forearm and elbow of a user, and a storage position folded forwardly over the upper support region. In the preferred embodiment, a wrist pad is positioned on the upper support region. Also the lower support region is connected with a short leaf and upper support region is connected with a long leaf, the leaves defining an offset hinge having a hinge pin. The upper support region has a surface area which is smaller than that of the lower support region. In the operating position the plane of the arm support surface is substantially parallel to the plane of the primary support surface. In one embodiment, the attachment means is comprised of a set of fasteners for rigidly mounting the upper support region to the primary support surface. In another embodiment, the attachment means enables the arm support surface to be movable from side-to-side relative to the primary support surface. The attachment means is comprised of an adjustable screw clamp for adjustably mounting the arm support surface about an axis perpendicular thereto. The clamp is removably attached to the front edge of the primary support surface. The clamp includes a generally U-shaped bracket having a first leg joined to a bottom surface of the upper support region along the longitudinal axis thereof, a second leg threadedly engaged by a rotatable clamping screw, and a bight portion joining the first leg and the second leg. In one particular embodiment, the bight portion is attached to a first U-shaped bracket having side walls formed with aligned screw threaded openings, and a second U-shaped bracket having side surfaces provided with aligned slots is secured to a bottom surface of the upper support region, such that the side surfaces of the second bracket will be in overlapping relation with the side walls of the first bracket and be retained by screws which are passed through the slots and into the screw threaded openings. In another embodiment the attachment means includes an auxiliary plate fixed to the primary support surface and having a rear pivot point to which the upper support region is attached and a forward edge formed with a series of spaced apart apertures selectively engageable with a spring-loaded latch fixed to the lower support region. The arm rest contemplates means for changing the plane of the arm support surface relative to the primary support surface. In another embodiment, the attachment means is comprised of adhesive means. In one particular embodiment the attachment means is comprised of a pair of double sided, upper adhesive strips, each upper strip having an upper surface attached to a bottom area of the arm support surface, a pair of wedge blocks, each block having an upper surface attached to the lower surface of one respective upper strip, and a pair of double sided, lower adhesive strips, each lower strip having an upper surface joined to a lower surface of a respective wedge block and a lower surface joined to the primary support surface. In other embodiments, the attachment means is comprised of suction cups or Velcro hook and loop or other interlocking tapes devices.

In another aspect of the invention, a lower arm rest is adapted to be mounted on a primary support surface having a front edge thereon. The arm rest includes a padded, arm support surface provided with an offset hinge for defining an upper support region and a lower support region. The upper support region is connected to and above the primary support surface by attachment means. The upper support region is provided with a wrist pad located adjacent the hinge and is adapted to support a mouse and mouse pad thereon along with a hand and wrist of a user. The lower support region has an operating position coplanar with the upper support region and hanging over the front edge of the primary support surface for supporting a forearm and elbow of a user, and a storage position folded forwardly over the upper support region.

Various other features, objects and advantages of the invention will be made apparent from the following. description taken together with the drawings.

BRIEF DESCRIPTION OF THE DRAWINGS

The drawings illustrate the best mode presently contemplated of carrying out the invention. Like numerals denote like elements.

In the drawings.

DETAILED DESCRIPTION OF THE INVENTION

Figure 1:
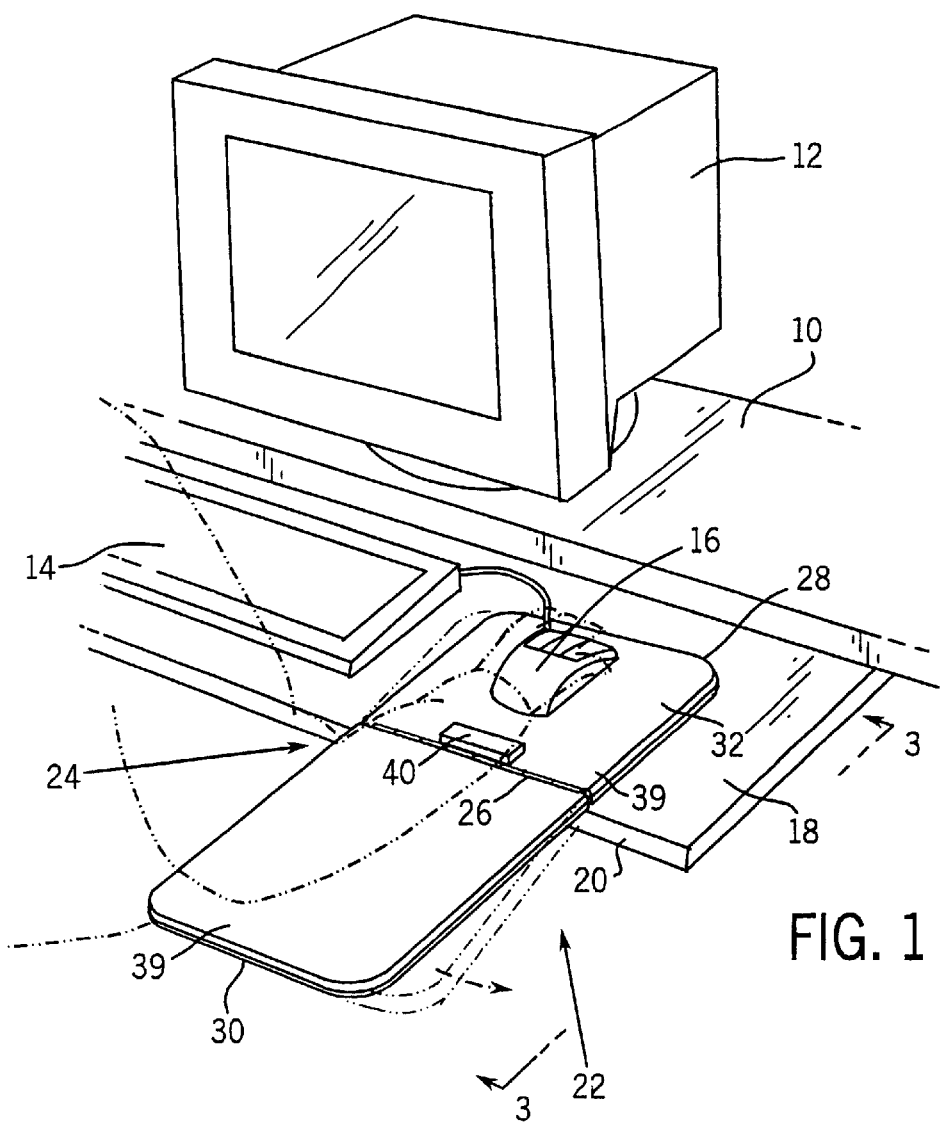
FIG. 1 is a perspective view of a primary support surface supporting a computer and keyboard and showing the lower arm rest of the present invention in an operating position.

Referring now to FIG. 1, a computer work area comprises a desk 10 having a computer monitor 12 resting thereon. Input to the monitor 12 is provided by means of a conventional keyboard 14 and, a mouse 16 which may be of the scroll or track-ball type. The particular desk arrangement shown has an extendable and retractable shelf 18 for supporting the keyboard 14, but it should be understood that the keyboard 14 could also be supported on the desk 10 itself. For purposes of this discussion, the desk 10 and its shelf 18 define a primary support surface having a front edge 20 thereon. The mouse 16 is shown positioned on a mouse work surface and lower arm rest 22 that is the preferred embodiment of the invention described herein. As will be appreciated hereafter, the lower arm rest 22 provides full stable support with a remarkably simple design to help reduce and minimize discomfort, fatigue and injury often experienced by prolonged use of the mouse 16. It should be further appreciated that the lower arm rest 22 is capable of being permanently or removably attached to various areas of the primary support surface and made adjustable relative thereto so as to optimize the comfort the computer operator.

Figure 3:
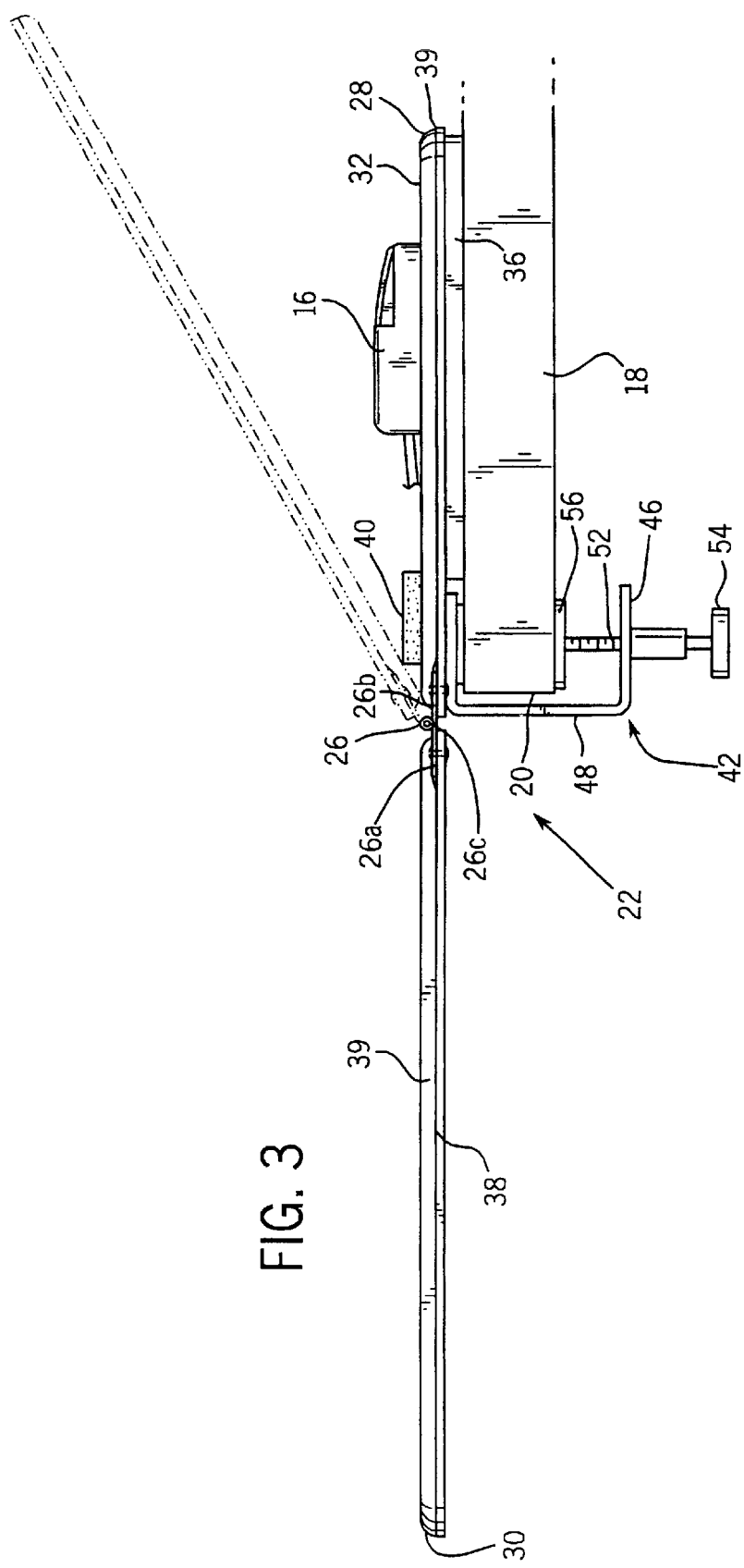
FIG. 3 is a side view of the lower arm rest shown in FIGS. 1 and 2.
Figure 4:
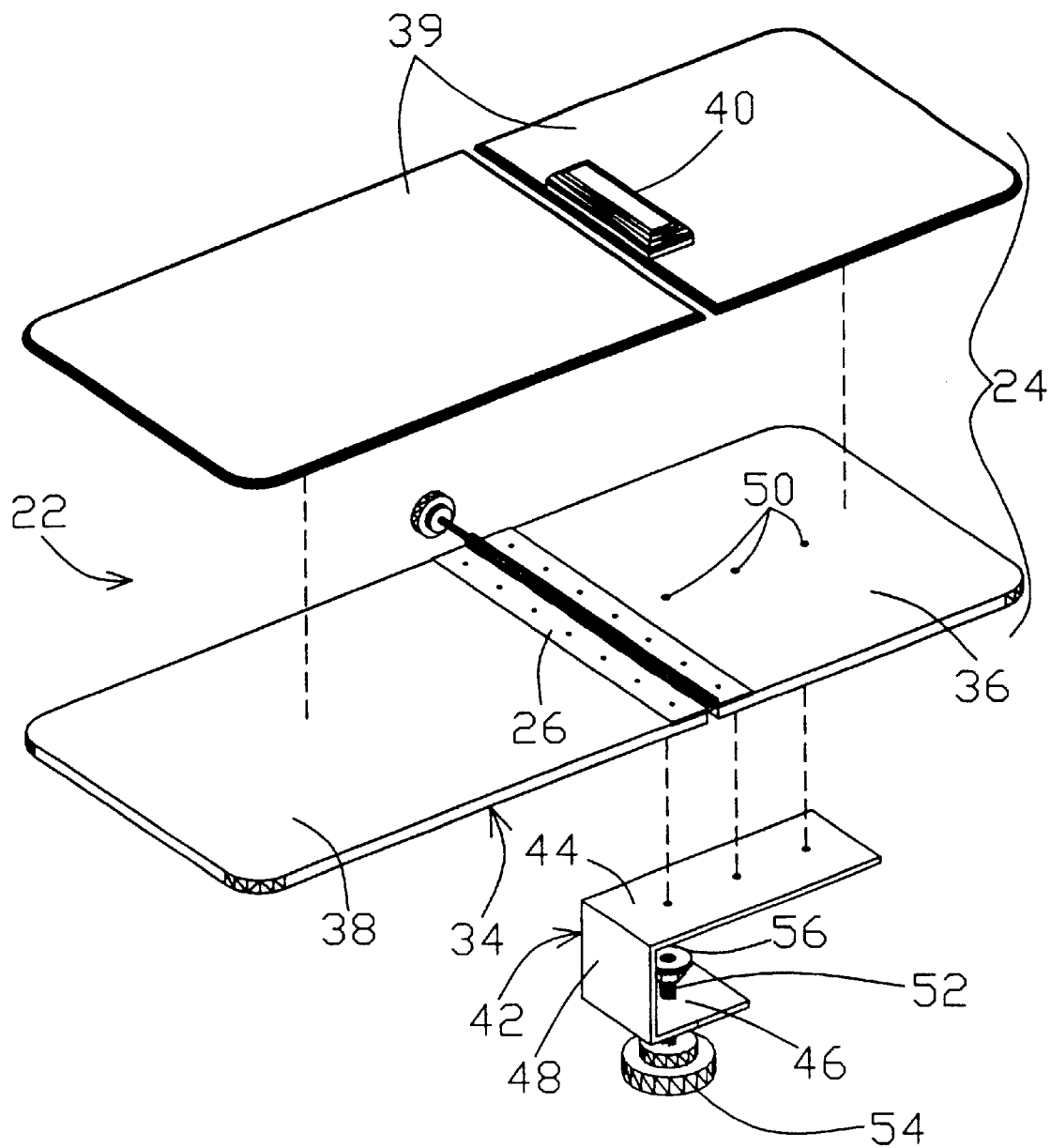
FIG. 4 is an exploded view of the lower arm rest shown in FIGS. 1–3.

The lower arm rest 22 includes a substantially planar, rectangular, arm support surface 24 provided with a continuous hinge 26, across its width which defines an upper support region 28 and a lower support region 30. As best seen in FIG. 3, hinge 26 is a custom design including a short leaf 26a connected to the lower support region 30, and a long leaf 16b connected to the upper support region 28. The leaves 26a, 26b have knuckles which define an offset hinge construction having hinge pin 26c. Such hinge provides a high degree of support and straightness. It should be appreciated that the preferred hinge construction can also be replaced by other hinge constructions. The latter region 30 has an operating position coplanar with the upper support region 28 for generally supporting the forearm and elbow of a mouse user. The upper support region 28 is adapted to support the mouse 16, or other input device, upon a mouse pad 32, along with the wrist and hand of the user. As seen in FIG. 4, the arm support surface 24 is comprised of a substantially rigid base plate 34 having a forward section 36 and a rearward section 38 joined by the hinge 26. The base plate 34 is typically constructed of wood or plastic and may be cut or molded as desired. The base plate 34 is completely covered on its upper surface with a padding or cushioning material 39, such as carpeting, cloth, leather, vinyl, foam rubber, or the like. The upper region 28 conveniently carries a built-in wrist pad 40 which is located immediately in front of the hinge 26. The upper support region 28 is generally smaller in surface area than the lower support region 30. Although not limited to the specified dimensions, typically the upper support region 28 measures eight inches in length by eight inches in width, while the lower support region 30 provides an eleven inch length by eight inch width surface. The depth of the padded arm support surface 24 is about one-quarter of an inch. The arm support surface 24 thus provides a nineteen inch length by eight inch wide footprint which, unlike many prior art devices, enables full support of the entire lower arm.

Figure 2:
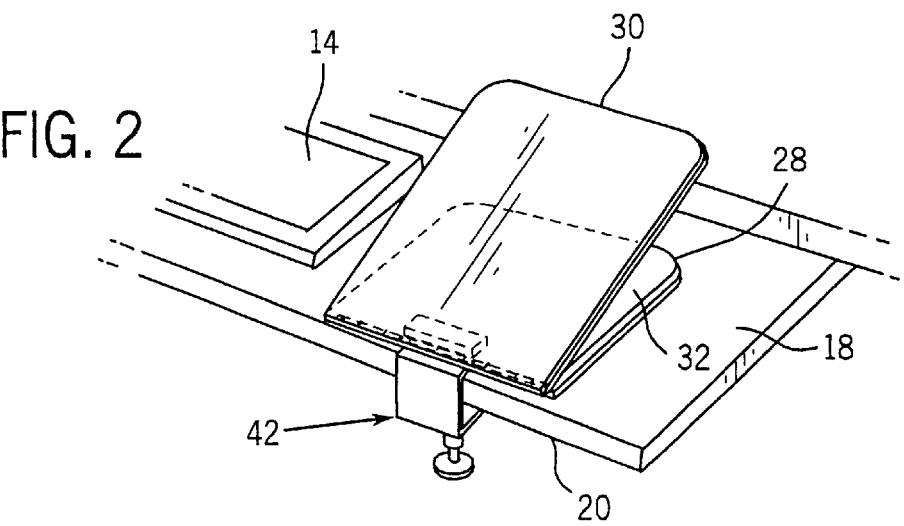
FIG. 2 is a view of the lower arm rest of FIG. 1 in a storage position.

In the preferred embodiment shown in FIGS. 3 and 4, the arm support surface 24 is removably attached to the front edge 20 of the primary support surface by an adjustable screw clamp 42 which normally holds the plane of the arm support Surface 24 substantially parallel to the plane of the primary support surface. The clamp 42 is comprised of a generally U-shaped bracket having a first leg 44 and a second leg 46 joined by a bight portion 48. The first leg 44 is connected to a bottom surface of the upper support region 28, such as by fasteners 50 along a longitudinal axis thereof. The second leg 46 is threadedly engaged with a rotatable clamping screw 52 having a grip knob 54 at the bottom end and engaging disc 56 at its top. The engaging disc 56 is preferably provided with a non-marring surface for engaging the bottom surface of the shelf 18, while the lower surface of first leg 44 rests upon the top surface of the shelf 18. The shape and location of the clamp 42 permits the arm support surface 24 to be adjusted somewhat from side-to-side relative to the primary support surface about an axis perpendicular thereto, as shown in phantom lines of FIG. 1. Therefore, the clamp 42 may be tightened against the shelf 18 to lock the arm support surface 24 such that its longitudinal axis is perpendicular to the front edge 20 or oriented such that the longitudinal axis is oriented at an acute angle relative to the front edge 20. Alternatively, the clamp 42 can be loosely attached to the shelf 18 so as to permit a side-to-side free moving or "floating" mode. In addition, the hinge 26 allows the lower support region 30 to be pivoted or folded forwardly from the coplanar operating position over the upper support region 28 to a storage position (shown in FIG. 2) which covers and protects the mouse in periods of non-use.

Figure 5:
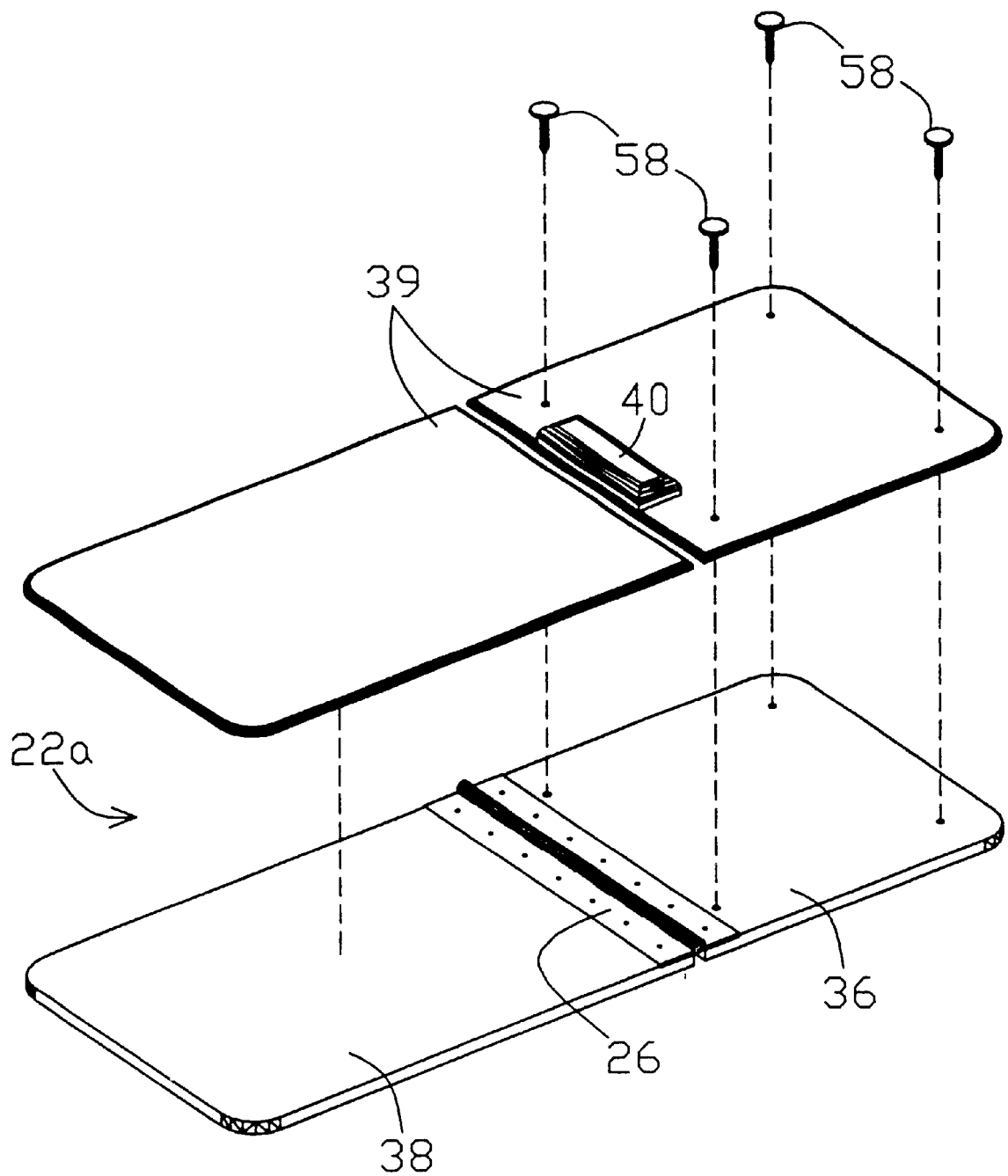
FIG. 5 is an exploded view of another embodiment of the lower arm rest.

Referring next to FIG. 5, the invention contemplates another embodiment of the arm rest 22a in which the upper support region 28 is permanently fixed to a planar surface of the primary support surface such as by using a set of fasteners which are shown as screws 58, but could also be rivets or nuts and bolts. This version gives the mouse operator the option of using more surface area to attach the lower arm rest 22 compared to the clamping design. As a result, the mouse 16 can be located in an operating zone closely adjacent the keyboard 14 of the computer.

Figure 6:
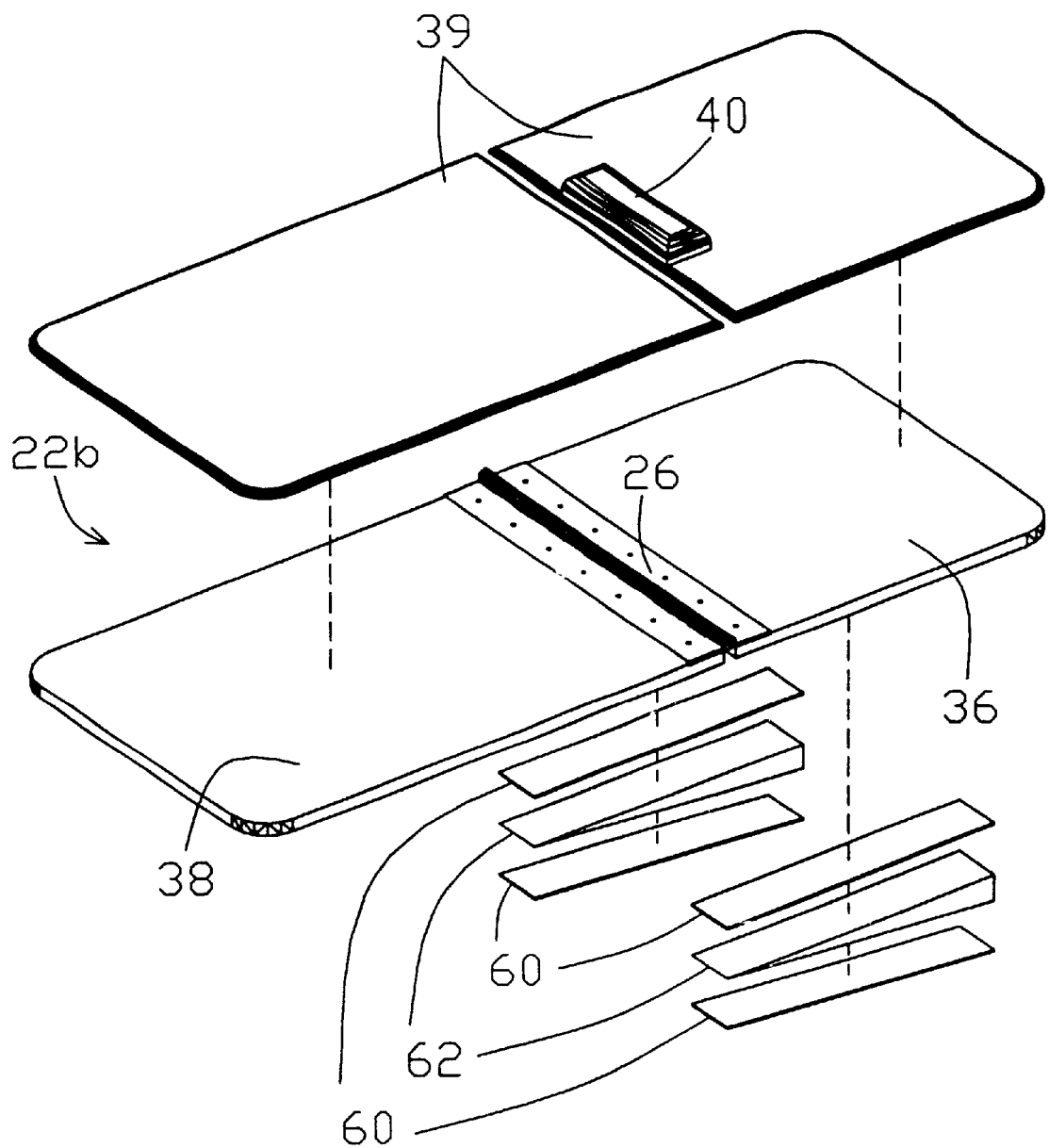
FIG. 6 is an exploded view of another embodiment of the lower arm rest.
Figure 7:
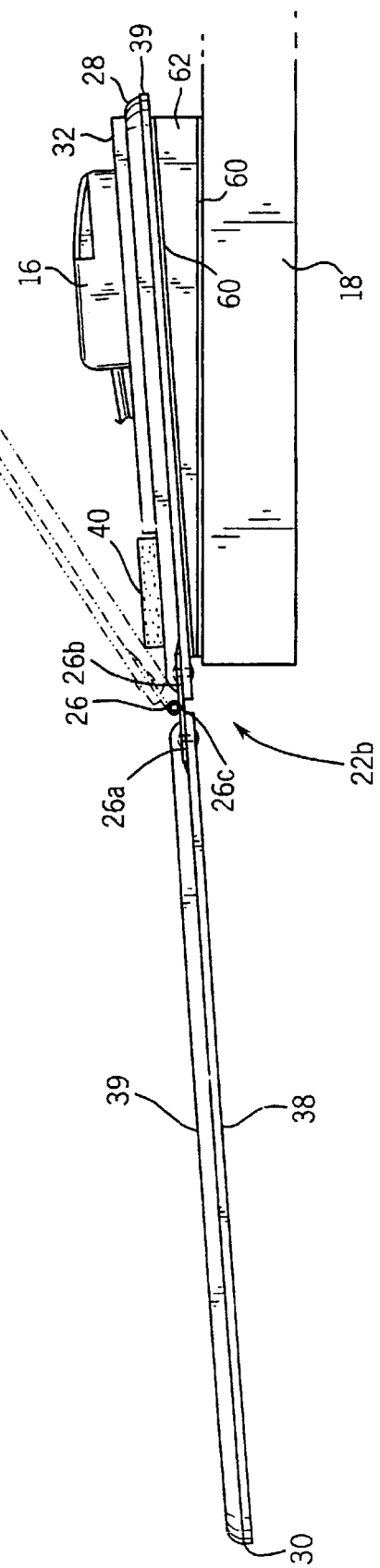
FIG. 7 is a side view of the lower arm rest shown in FIG. 6.

FIGS. 6 and 7 illustrate another embodiment of the arm rest 22b in which the upper support region is permanently fixed to the primary support surface using adhesive means in the form of an upper and lower pair of double sided adhesive strips 60. The strips 60 are employed in combination with a pair of wedge blocks 62 which enable the plane of the arm support surface 24 to be changed relative to the primary support surface. More particularly, the wedge blocks 62 are oriented so as to slightly tilt the plane of the arm support surface 24 downwardly. Each upper strip 60 has an upper surface attached to a bottom area of the arm support surface 24. Each wedge block 62 has an upper surface attached to a lower surface of one respective upper strip 60. Each lower strip 60 has an upper surface joined to a lower surface of a respective wedge block 62 and a lower surface adhered to the primary support surface. It should be understood that the wedge block 62 could also be reversely oriented to tilt the arm support surface upwardly.

Figure 8:
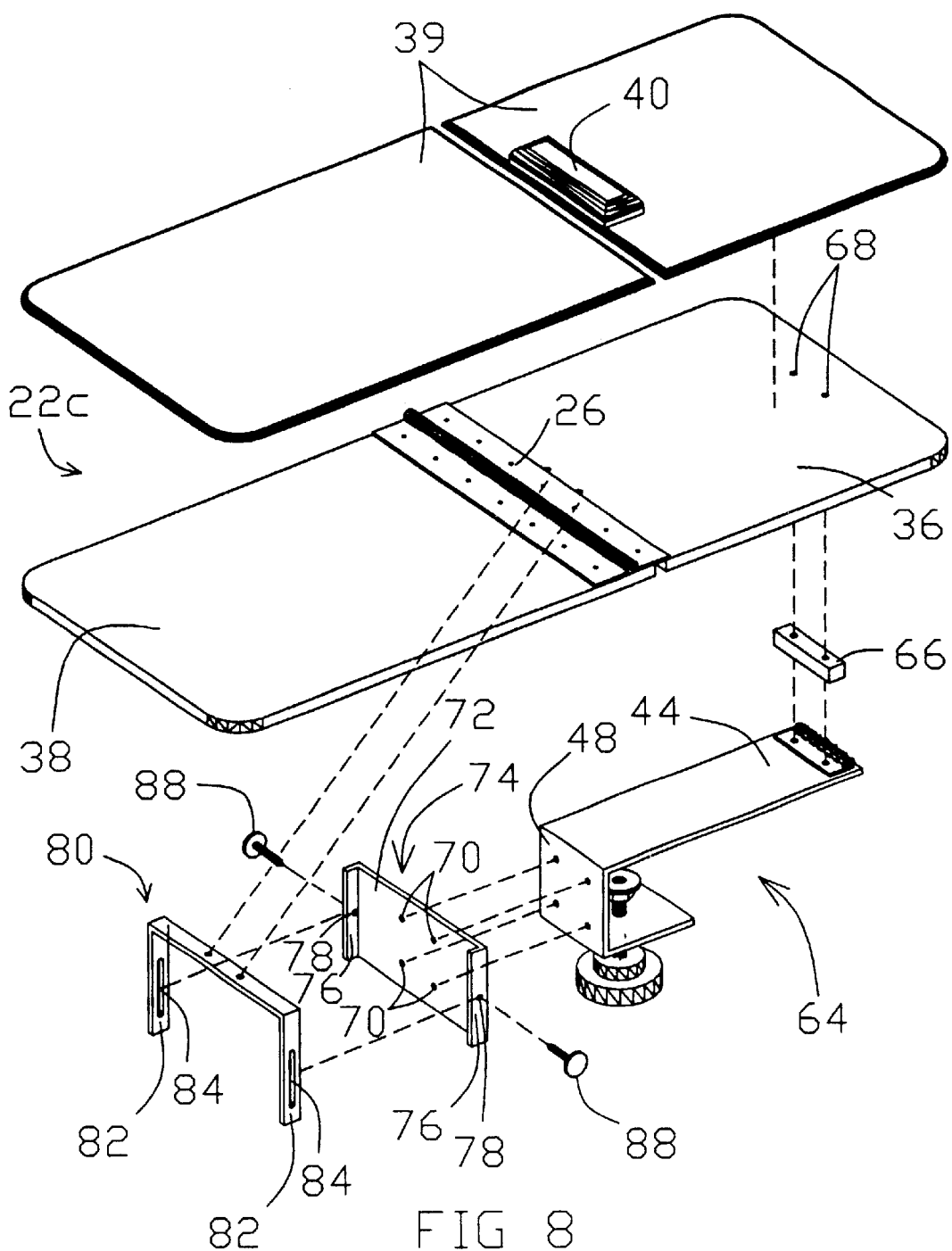
FIG. 8 is an exploded view of another embodiment of the lower arm rest.

FIG. 8 shows a further embodiment of an arm rest 22c having a modified screw clamp 64 which permits both side-to-side movement and means for changing the plane of the arm support surface 24 relative to the primary support surface. In this design, the front end of leg 44 of clamp 64 is attached via a spacer 66 to the forward edge of the upper support region such as by fasteners 68. The bight portion 48 is connected such as by rivets 70 to the rear wall 72 of a first Ushaped bracket 74 having a pair of side walls 76 formed with aligned screw threaded openings 78. A second U-shaped bracket 80 has side surfaces 82 provided with aligned slots 84 and a connecting portion 86. The latter is secured to a bottom surface of the upper support region 28 in front of the hinge 26 such as by fasteners 86, such that the side surfaces 82 of the second bracket 80 will lie in overlapping relationship with the side walls 76 of the first bracket 74 and be retained by screws 88 which are passed through the slots 84 and into the screw threaded openings 78.

Figure 9:
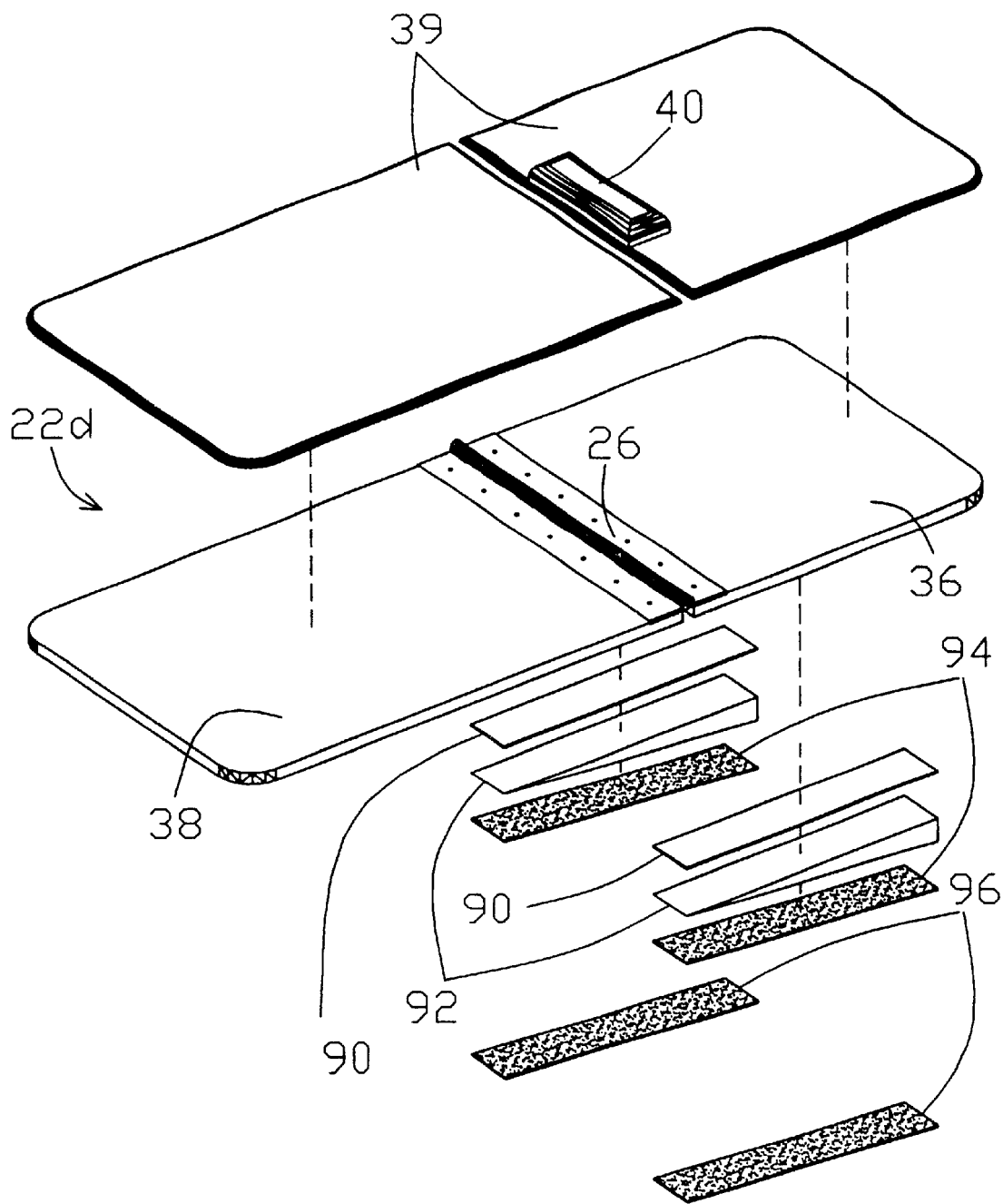
FIG. 9 is an exploded view of another embodiment of the lower arm rest.

FIG. 9 represents yet another embodiment of an arm rest 22d having a pair of double sided adhesive strips 90, a pair of wedge blocks 92 for changing the plane of the arm support surface 24, and two pair 94, 96 of self-adhesive Velcro® or other brand hook and loop or interlocking tape/devices. The upper surface of the adhesive strips 90 stick to the bottom surface of the upper support region 28, while the lower surface of the strips 90 adhere to the top of the wedge blocks 92. The bottom of the wedge blocks 92 are joined to the adhesive upper side of the tapes 94, while the lower side of the tapes 94 cooperate with the upper sides of the tapes 96. The lower sides of the tapes 96 are provided with adhesive to be secured to the primary support surface.

Figure 10:
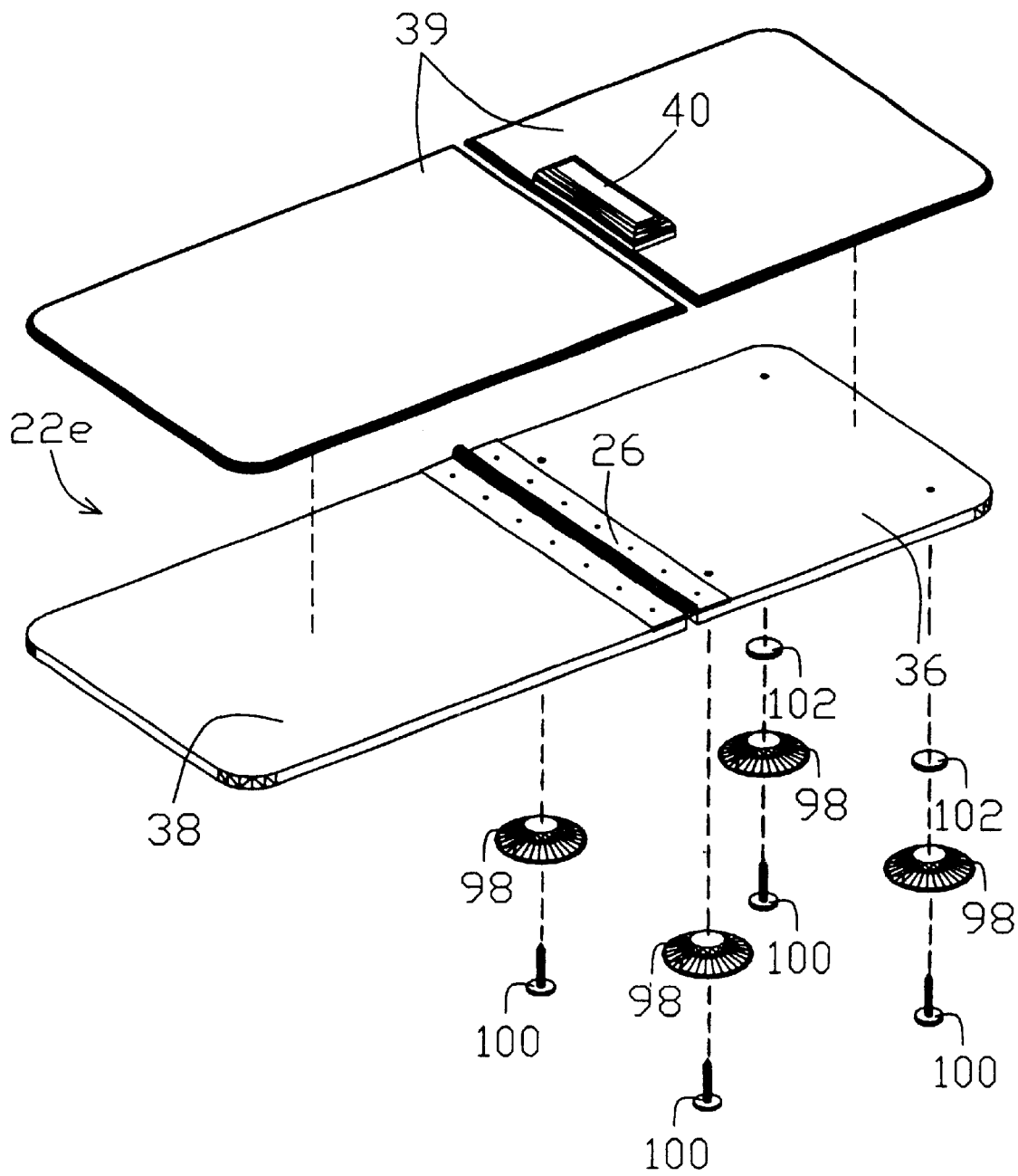
FIG. 10 is an exploded view of another embodiment of the lower arm rest.

FIG. 10 designates an additional embodiment of an arm rest 22e having attachment means in the form of a set of suction cups 98 secured to the bottom surface of the upper support region 28 by fasteners 100. The suction cups 98 nearest hinge 26 are provided with spacers 102 which allow for the tilt of the arm support surface 24.

Figure 11:
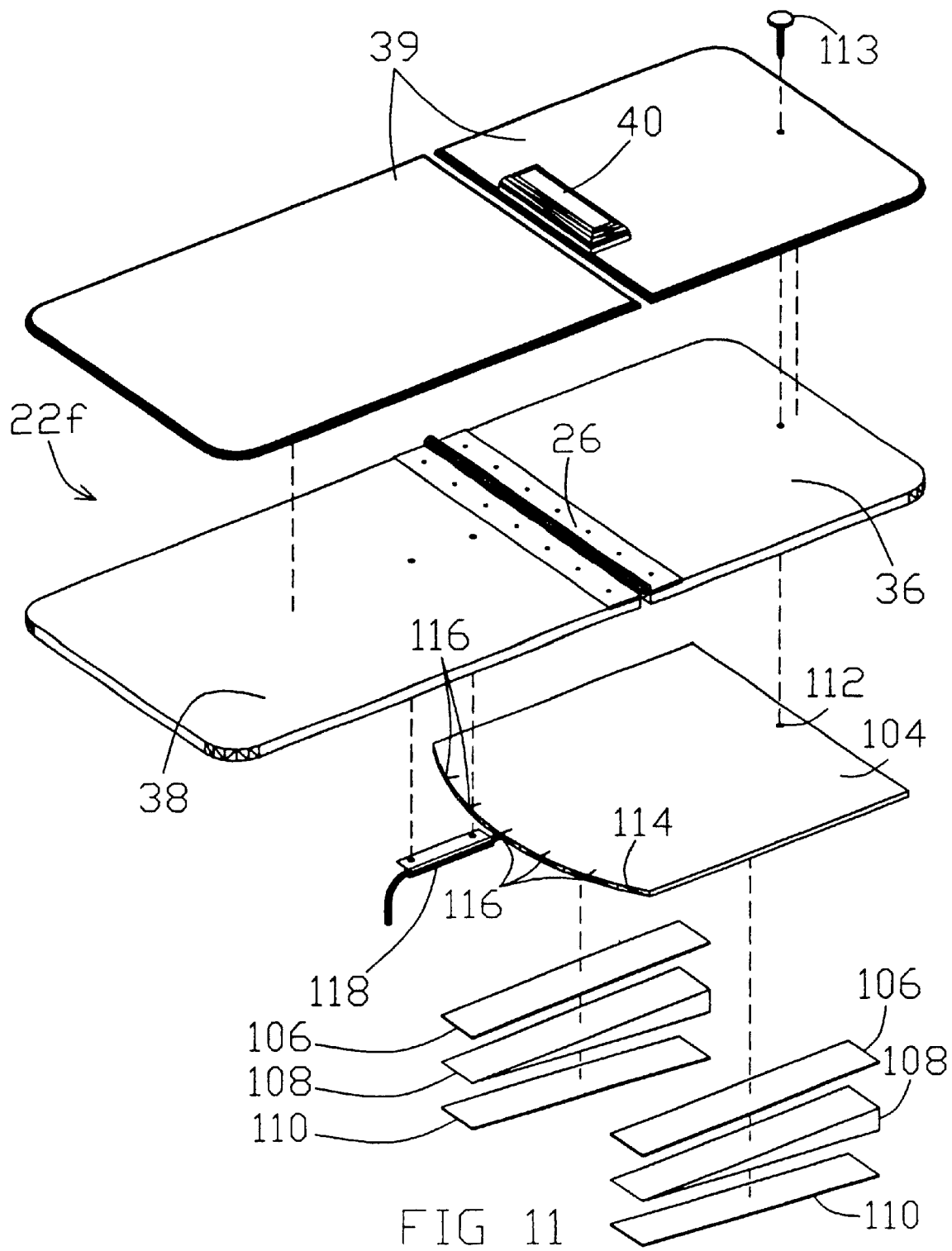
FIG. 11 is an exploded view of another embodiment of the lower arm rest.

FIG. 11 is still another embodiment of an arm rest 22f wherein the attachment means includes an auxiliary plate 104 having a bottom surface fixed to primary support surface by an upper pair of double sided adhesive tapes 106, a pair of wedge blocks 108 and a lower pair of double sided adhesive tapes 110. The auxiliary plate 104 has a rear pivot point 112 to which the upper support region 20 is attached such as by fasteners 113. The auxiliary plate 104 also has a forward edge 114 formed with a series of spaced apart apertures 116 selectively engageable with a spring-loaded latch 118 fixed such as by fasteners 120 to the bottom of the lower support region 30. This model again provides for side-to-side movement and a tilting orientation of the arm support surface 24.

In each of the aforedescribed embodiments, it is important to note that the arm support surface 24 is maintained in a planar disposition so as to provide proper economic support for the lower arm. The tilt and wrist pad 40 functions to directly address the prevent of carpal tunnel syndrome. Each arm rest embodiment may be used with right or left handed operators and can be adjusted depending on chair height and the desired angle.

Although several of the embodiments disclose a preferred use of double sided adhesive strips or tape, it should be understood that many other types of adhesive and glue may also be utilized. It should likewise be understood that the arm rest may be used with a calculator or notepad and provides a convenient tabular extension for various other support applications.

Various alternatives and embodiments are contemplated as being within the scope of the following claims particularly pointing out and distinctly claiming the subject matter regarded as the invention.

I claim:

1. A computer mouse support and lower arm rest in combination with a primary support surface for supporting a desktop computer and a keyboard, the computer mouse support and lower arm rest comprising:

a padded, substantially flat, rectangular arm support surface provided with a hinge overlying a front edge of the primary support for defining an upper support region and a lower support region, the upper support region being connected to and above the primary support surface by attachment means, the upper support region being provided with a wrist pad located adjacent and forwardly of the hinge and being adapted to support a mouse and mouse pad thereon along with a hand and wrist of a user, the lower support region having an operating position coplanar with the upper support region and hanging over the front edge of the primary support surface for supporting a forearm and elbow of a user, and a storage position folded forwardly over the upper support region into engagement with the wrist pad for protectively covering the mouse.

2. The computer mouse support and lower arm rest of claim 1, wherein the attachment means is comprised of a set of fasteners for rigidly mounting the upper support region to the primary support surface.

3. The computer mouse support and lower arm rest of claim 1, wherein the attachment means includes an auxiliary plate fixed to the primary support surface and having a rear pivot point to which the upper support region is attached and a forward edge formed with a series of spaced apart apertures selectively engageable with a spring-loaded latch fixed to the lower support region.

4. The computer mouse support and lower arm rest of claim 1, including means for changing the plane of the arm support surface relative to the primary support surface.

5. The computer mouse support and lower arm rest of claim 1, wherein the attachment means is comprised of adhesive means for attaching the lower arm rest to various areas of the primary support surface.

6. The computer mouse support and lower arm rest of claim 1, wherein the attachment means is comprised of a pair of double-sided, upper adhesive strips, each upper strip having an upper surface attached to a bottom area of the arm support surface, a pair of wedge blocks, each block having an upper surface attached to a lower surface of one respective upper strip, and a pair of double-sided, lower adhesive strips, each lower strip having an upper surface joined to a lower surface of a respective wedge block and a lower surface joined to the primary support surface.

7. The computer mouse support and lower arm rest of claim 1, wherein the attachment means is comprised of suction cups.

8. The computer mouse support and lower arm rest of claim 1, wherein the attachment means is comprised of interlocking tapes.

9. The computer mouse support and lower arm rest of claim 1, wherein the attachment means has a bight portion attached to a first U-shaped bracket having side walls formed with aligned screw threaded openings, and a second U-shaped bracket having side surfaces provided with aligned slots is secured to a bottom surface of the upper support region such that the side surfaces of the second bracket lie in overlapping relationship with the side walls of the first bracket and be retained by screws which are passed through the slots and into the screw threaded openings.

* * * * *